(12) United States Patent
Sakai

(10) Patent No.: US 8,678,683 B2
(45) Date of Patent: Mar. 25, 2014

(54) IMAGE-PICKUP APPARATUS HAVING SHUTTER APPARATUS

(71) Applicant: Canon Kabushiki Kaisha, Tokyo (JP)

(72) Inventor: Masanori Sakai, Yokohama (JP)

(73) Assignee: Canon Kabushiki Kaisha (JP)

(*) Notice: Subject to any disclaimer, the term of this patent is extended or adjusted under 35 U.S.C. 154(b) by 0 days.

(21) Appl. No.: 13/799,191

(22) Filed: Mar. 13, 2013

(65) Prior Publication Data
US 2013/0251359 A1 Sep. 26, 2013

(30) Foreign Application Priority Data

Mar. 22, 2012 (JP) .................................. 2012-065171
Mar. 22, 2012 (JP) .................................. 2012-065236

(51) Int. Cl.
*G03B 9/08* (2006.01)

(52) U.S. Cl.
USPC .......................................................... 396/467

(58) Field of Classification Search
USPC .......................................................... 396/467
See application file for complete search history.

(56) References Cited

U.S. PATENT DOCUMENTS

| 5,008,605 A | * | 4/1991 | Ohara et al. | 318/630 |
| 7,920,201 B2 | * | 4/2011 | Wakikawa et al. | 348/335 |
| 2012/0281134 A1 | * | 11/2012 | Okutani | 348/362 |
| 2013/0021508 A1 | * | 1/2013 | Uranishi et al. | 348/294 |

FOREIGN PATENT DOCUMENTS

| JP | 2009-031513 A | 2/2009 |
| JP | 2010-164903 A | 7/2010 |

* cited by examiner

*Primary Examiner* — Clayton E Laballe
*Assistant Examiner* — Linda B Smith
(74) *Attorney, Agent, or Firm* — Rossi, Kimms & McDowell LLP

(57) ABSTRACT

An image-pickup apparatus includes a driving member for leading blades configured to drive a leading blade group, a driving member for trailing blades configured to drive a trailing blade group, a cam member configured to rotate the driving member for leading blades and the driving member for trailing blades, a motor configured to drive the cam member, and a controller configured to control the motor. The controller applies a second voltage that is lower than a first voltage applied in releasing the driving member for leading blades to the motor when the driving member for trailing blades is released at normal shooting, and a third voltage that is lower than the first voltage and that is higher than the second voltage to the motor when the driving member for trailing blades is released at live view shooting.

11 Claims, 13 Drawing Sheets

IMAGE-PICKUP APPARATUS HAVING SHUTTER APPARATUS

BACKGROUND OF THE INVENTION

1. Field of the Invention

The present invention relates to an image-pickup apparatus such as a digital camera, and more particularly to an image-pickup apparatus having a shutter apparatus.

2. Description of the Related Art

A shutter apparatus has a leading blade group (hereinafter referred to as "leading blade") that travels from a state in which an opening of a shutter closes (hereinafter referred to as "closed state") to a state in which the opening opens (hereinafter referred to as "opened state"), and a trailing blade group (hereinafter referred to as "trailing blade") that travels from the opened state to the closed state. Each of the leading and the trailing blades is configured by a plural of light shielding blades, and the light shielding blades are coupled by an arm so as to form a parallel link and are translated in a travelling direction.

Some image-pickup apparatuses including the shutter apparatus have a live view function in which the shutter apparatus is opened before shooting and a dynamic picture image generated by an output from an image-pickup element is displayed on a monitor in the back side of the camera.

Japanese Patent Laid-open No. 2009-31513 discloses an image-pickup apparatus that controls an applied voltage to a motor when the image-pickup apparatus transits from stop phase to live view phase so as to reduce a release time lag.

However, Japanese Patent Laid-open No. 2009-31513 does not disclose an optimum applied voltage to the motor from live view phase until shooting phase.

Additionally, an arm of the shutter apparatus is driven by a driving lever biased by a spring. The driving lever has an amateur attracted to an energized electromagnet at a position where the spring is charged.

The driving lever turns by biasing of the spring when energizing to the electromagnet is stopped, and the plurality of the light shielding blades are travelled via the arm. The charge mechanism including the motor returns the driving lever to the charge position while charging the spring, and returns the leading and the trailing blades to each starting position when the exposure by travelling of the leading and the trailing blades ends.

Japanese Patent Laid-open No. 2010-164903 discloses a configuration that cam lift of a cum surface traced by the driving lever at the end of the charge operation is smaller than cam lift of a cum surface traced by the driving lever at the beginning of the charge operation, and have achieved to drop the collision speed of the amateur and the electromagnet.

However, the image-pickup apparatus of Japanese Patent Laid-open No. 2010-164903 have caused accuracy change when the release frequency increases because the driving lever is not fully slowed down at the end of the charge operation.

SUMMARY OF THE INVENTION

The present invention provides an image-pickup apparatus that does not require energizing to a trailing blade holding electromagnet in live view, can shorten a release time lag, and can speed up the continuous shooting speed. Further, the present invention provides the image-pickup apparatus that does not easily cause accuracy change even if the release time lag is shortened, continuous shooting speed is sped up, and the release frequency increases.

An image-pickup apparatus as one aspect of the present invention includes a driving member for leading blades configured to drive a leading blade group, a driving member for trailing blades configured to drive a trailing blade group, a cam member configured to rotate the driving member for leading blades and the driving member for trailing blades, a motor configured to drive the cam member, and a controller configured to control the motor. The controller applies a second voltage that is lower than a first voltage applied in releasing the driving member for leading blades to the motor when the driving member for trailing blades is released at normal shooting, and a third voltage that is lower than the first voltage and that is higher than the second voltage to the motor when the driving member for trailing blades is released at live view shooting.

An image-pickup apparatus as another aspect of the present invention includes a driving member for leading blades configured to drive a leading blade group, a driving member for trailing blades configured to drive a trailing blade group, a cam member configured to rotate the driving member for leading blades and the driving member for trailing blades, a motor configured to drive the cam member, and a controller configured to control the motor. A leading blade first cam surface where the driving member for leading blades traces, a leading blade second cam surface having a cam lift smaller than a cam lift of the leading blade first cam surface, a trailing blade first cam surface where the driving member for trailing blades traces, and a trailing blade second cam surface having a cam lift smaller than a cam lift of the trailing blade first cam surface are formed on the cam member. And the controller controls an applied voltage to the motor in performing charge operation on the trailing blade second cam surface by the cam member so as to be lower than an applied voltage to the motor in performing charge operation on the trailing blade first cam surface by the cam member.

Further features of the present invention will become apparent from the following description of exemplary embodiments with reference to the attached drawings.

DESCRIPTION OF THE PREFERRED EMBODIMENTS

Figure 1:
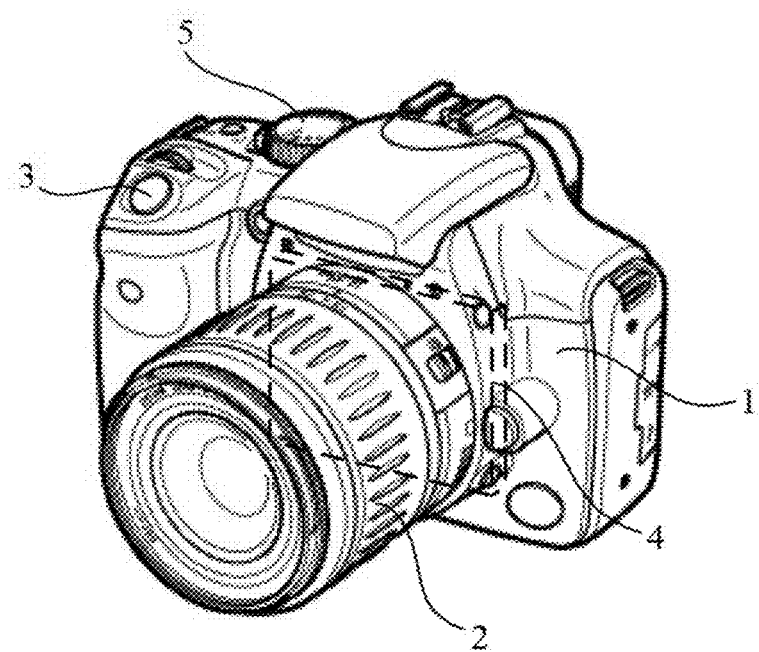
FIG. 1 is a perspective view seen from diagonally forward of an image-pickup apparatus that is Embodiment 1.

Exemplary embodiments of the present invention will be described below with reference to the accompanied drawings. In each of the drawings, the same elements will be denoted by the same reference numerals and the duplicate descriptions thereof will be omitted.

[Embodiment 1]

Figure 2:
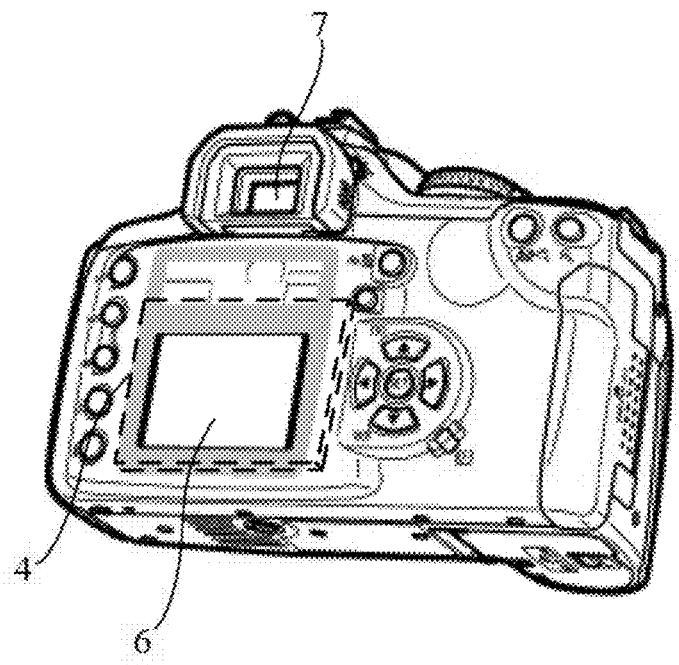
FIG. 2 is a perspective view seen from diagonally backward of the image-pickup apparatus of Embodiment 1.

FIG. 1 illustrates a perspective view seen from diagonally forward of a digital single-lens reflex camera (image-pickup apparatus) that is Embodiment 1 of the present invention and FIG. 2 is a perspective view seen from diagonally backward of the digital single-lens reflex camera.

An image-pickup lens 2 is detachably attached to a digital single-lens reflex camera 1 (hereinafter, referred to as a "camera"). A release button 3 is a two-step switch so as to instruct the beginning of photometry and focus detection, and to instruct a shooting. A state lightly pressing the release button 3 into a first step is called "Half-pressing", and photometry and focus detection are performed in the state. A state further pressing from the "Half-pressing" into a second step is called "Full-pressing", and a shutter apparatus 4 is driven and shooting is performed in the state. A mode dial switch 5 switches various shooting modes of the camera. Moreover, an image display 6 is used so as to confirm and select a shot image, and select and set a menu function, and an optical viewfinder 7 is used so as to confirm an object image.

Figure 3:
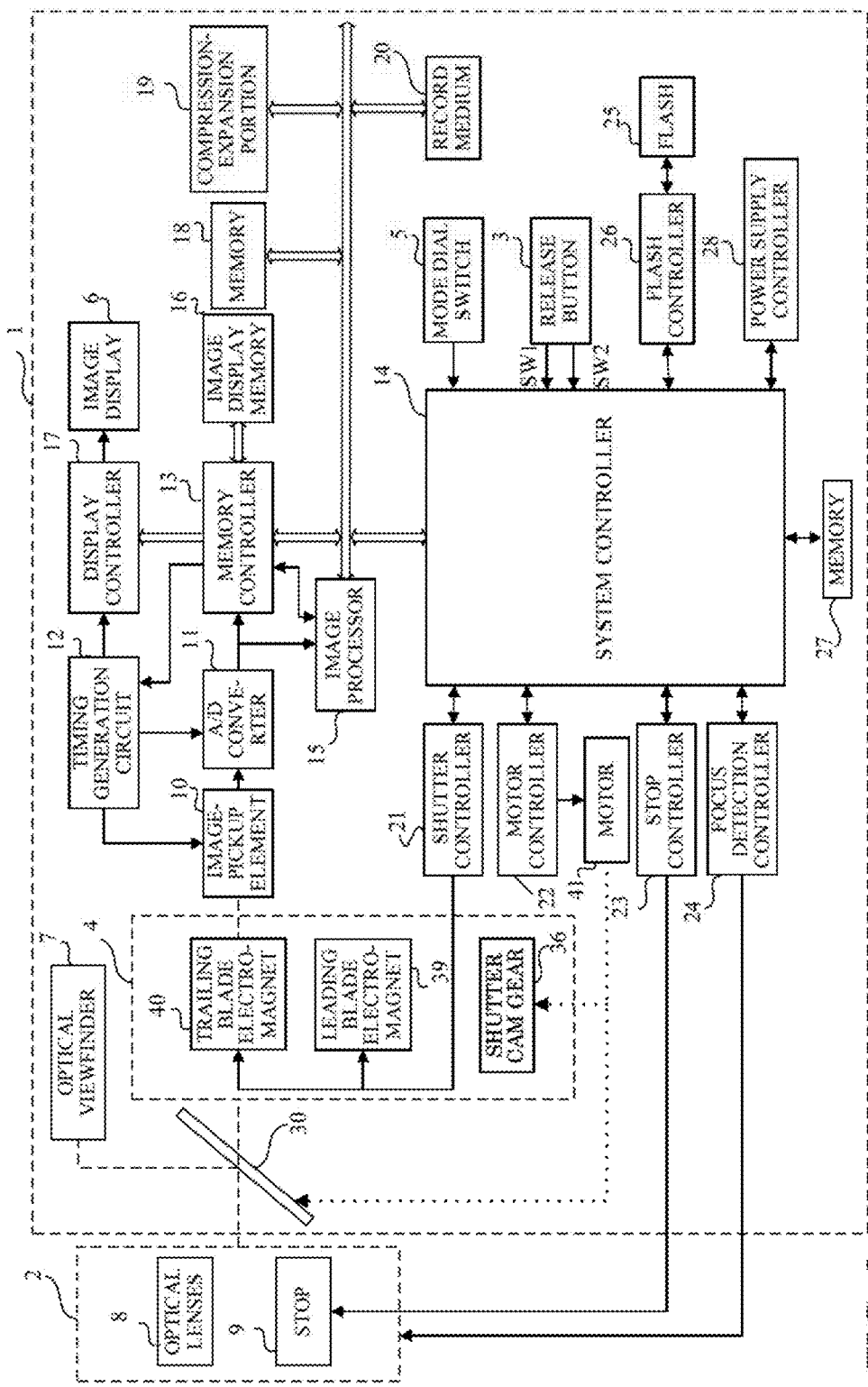
FIG. 3 is a block diagram illustrating a configuration of a control system of the image-pickup apparatus of Embodiment 1.

FIG. 3 illustrates a block diagram of a configuration of a control system of the camera 1 and the image-pickup lens 2. The image-pickup lens 2 houses an image-pickup optical system including a plurality of optical lenses 8 and a stop 9. An image-pickup element 10 includes a CCD sensor, a CMOS sensor, or the like, which performs a photoelectric conversion of the object image, and an A/D converter 11 converts an analog image-pickup signal from the image-pickup element 10 into a digital image data. Moreover, a timing generation circuit 12 provides clock signals and control signals to the image-pickup element 10 and the A/D converter 11, which is controlled by a memory controller 13 and a system controller 14.

The memory controller 13 controls the A/D converter 11, the timing generation circuit 12, an image processor 15, an image display memory 16, a display controller 17, a memory 18, and a compression-expansion portion 19. The data output from the A/D converter 11 is written in the image display memory 16 or the memory 18 via the image processor 15 and the memory controller 13, or the data of the A/D converter 11 is directly written in the image display memory 16 or the memory 18 via the memory controller 13.

The system controller 14 is configured by a microcomputer unit including a CPU, which executes a program stored in a memory 27 and controls the entirety of the camera.

The image processor 15 performs a predetermined image processing such as a pixel interpolation processing or a color conversion processing for the image data from the A/D converter 11 or the memory controller 13. Moreover, the image processor 15 performs a predetermined calculation processing by using the image data output from the A/D converter 11, and also performs an AWB (auto white balance) control processing of a TTL (through the lens) method based on the obtained calculation result.

The memory 18 is a memory to store the shot images, which has a storage capacity enough to store the prescribed number of images. The compression-expansion portion 19 performs a compression processing or an expansion processing for the image read from the memory 18 according to the predetermined image compression-expansion processing method (for example, adaptive discrete cosine transform, or the like), and writes the image data which completed the processing in the memory 18. In addition, the image data which completed the processing is recorded in a record medium 20. The record medium 20 is configured by a non-volatile memory such as a flash memory, which is detachably attached to the camera 1. Furthermore, the image data from the record medium 20 is read into the memory 18, and the compression-expansion portion 19 writes the image data in the image processor 15 and the image display memory 16 via the memory controller 13 so as to display in the image display 6 by the display controller 17.

A shutter controller 21 controls power supply of a leading blade electromagnet 39 which includes a leading blade coil and a leading blade yoke, and hold a leading blade group of the shutter apparatus 4 in a charge state, and a trailing blade electromagnet 40 which includes a trailing blade coil and a trailing blade yoke, and hold a trailing blade group in a charge state. A motor 41 is driven based on a control signal from a motor controller 22, and drives a shutter cam gear 36 that is a first cam gear and a quick return mirror 30 to the predetermined position in conjunction with an operation of the release button 3.

A stop controller 23 controls the stop 9, and a focus detection controller 24 controls focusing of the image-pickup lens 2. Moreover, a flash controller 26 controls luminescence of a flash 25.

A memory 27 stores a constant, a variable, a program, or the like for the operation of the system controller 14.

A power supply controller 28 includes a power supply detection circuit, a DC-DC converter, and a switch circuit converting a power supply circuit block, or the like. A power supply controller 28 detects the presence of the power supply, the kind of the power supply, and the detection of the battery power, or the like, controls the DC-DC converter based on the detection results and the instruction of the system controller 14, and supplies a necessary voltage to each part including the record medium for a necessary period.

Figure 4:
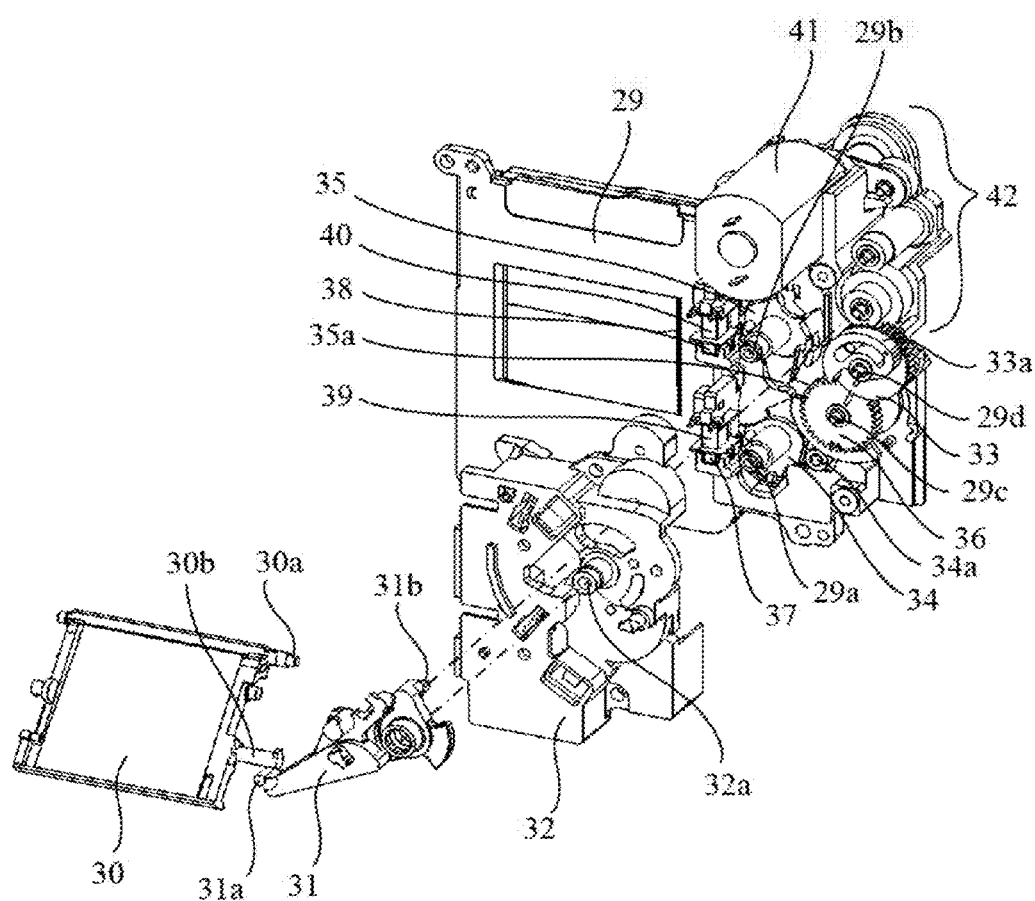
FIG. 4 is an exploded perspective view of a shutter apparatus and a quick return mirror provided in the image-pickup apparatus of Embodiment 1.

FIG. 4 illustrates an exploded perspective view of the shutter device 4 and the quick return mirror 30.

A shutter base plate 29 is fixed to a mirror box of the camera that is not shown in drawings, and is provided each part that configures a drive mechanism of the leading blade group and the trailing blade group. The quick return mirror 30 swings up and down so as to enter or evacuate relative to an optical path in the mirror box by reciprocating around an axis 30a. A mirror drive lever 31 that is a mirror drive part is supported capable of turning around an axis 32a of a MG base plate 32. A torsion coil spring that is not shown in drawings is arranged around the axis 32a of the MG base plate 32, and biases the mirror drive lever 31 in a clockwise direction (a direction where the quick return mirror 30 is up).

An axis 31a of the mirror drive lever 31 comes into contact with an axis 30b of the quick return mirror 30 that is arranged on the underside of an image-pickup optical axis, and is a driven part of the quick return mirror 30. In addition, an axis 31b of the mirror drive lever 31 comes into contact with a cam surface 33a formed on a mirror cam gear 33 that is a second cam gear. The quick return mirror 30 is biased by a spring that is not shown in drawings according to motion of the mirror drive lever 31.

A leading blade drive lever 34 that is a driving member for leading blades and a trailing blade drive lever 35 that is a driving member for trailing blades are rotatably supported by a leading blade axis 29a and a trailing blade axis 29b that are arranged at the base plate 29, respectively. A shutter cam gear 36 is rotatably supported around a shutter cam gear 29c arranged at the opposite side of the image-pickup optical axis relative to a line connecting the leading blade axis 29a and the trailing blade axis 29b between the leading blade axis 29a and the trailing blade axis 29b. A leading blade charge roller 34a that is arranged at the leading blade drive lever 34 and is a pushed part and a trailing blade charge roller 35a that is arranged at the trailing blade drive lever 35 and is a pushed part touch a cam surface formed on the shutter cam gear 36. Moreover, a leading blade amateur 37 and a trailing blade amateur 38 are arranged at the leading blade drive lever 34 and the trailing blade drive lever 35, respectively, and are attached by applying voltages to the leading blade electromagnet 39 and the trailing blade electromagnet 40 that are arranged at the MG base plate 32. In addition, the mirror cam gear 33 is rotatably supported around a mirror cam gear axis 29d that is arranged at the shutter base plate 29 and faces the same direction with the image-pickup optical axis direction, and directly connects with the shutter cam gear 36.

A driving force that is generated at the motor 41 having the output axis parallel to the image-pickup optical axis is transmitted through a reduction gear train 42 and the mirror cam gear 33 that are transmitted part, and rotates the mirror driving lever 31 and the shutter cam gear 36. Thus, reciprocating motion of the quick return mirror 30, and charge and release of the shutter apparatus 4 are performed.

Figure 5:
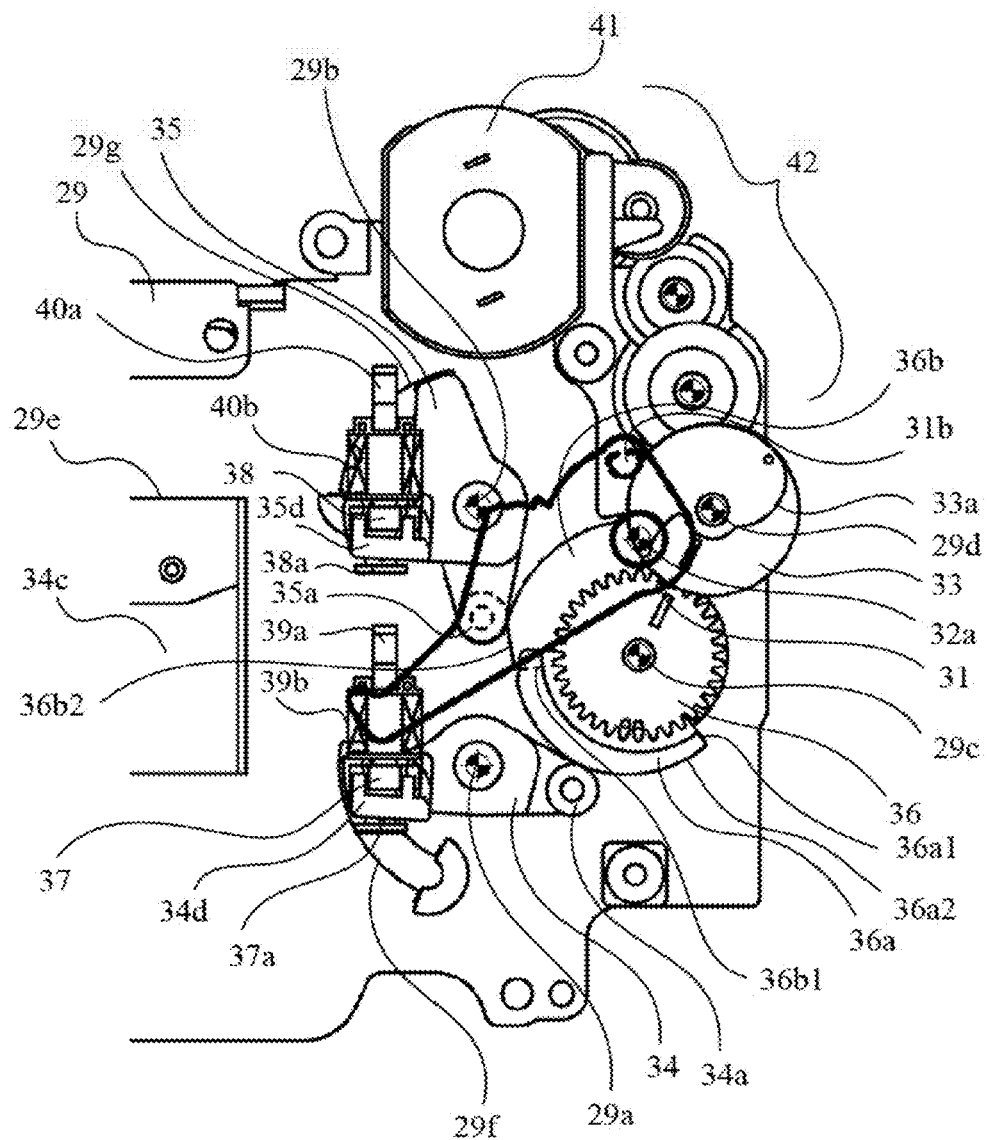
FIG. 5 is a plan view illustrating a charge completed state of the shutter apparatus provided in the image-pickup apparatus of Embodiment 1.
Figure 6:
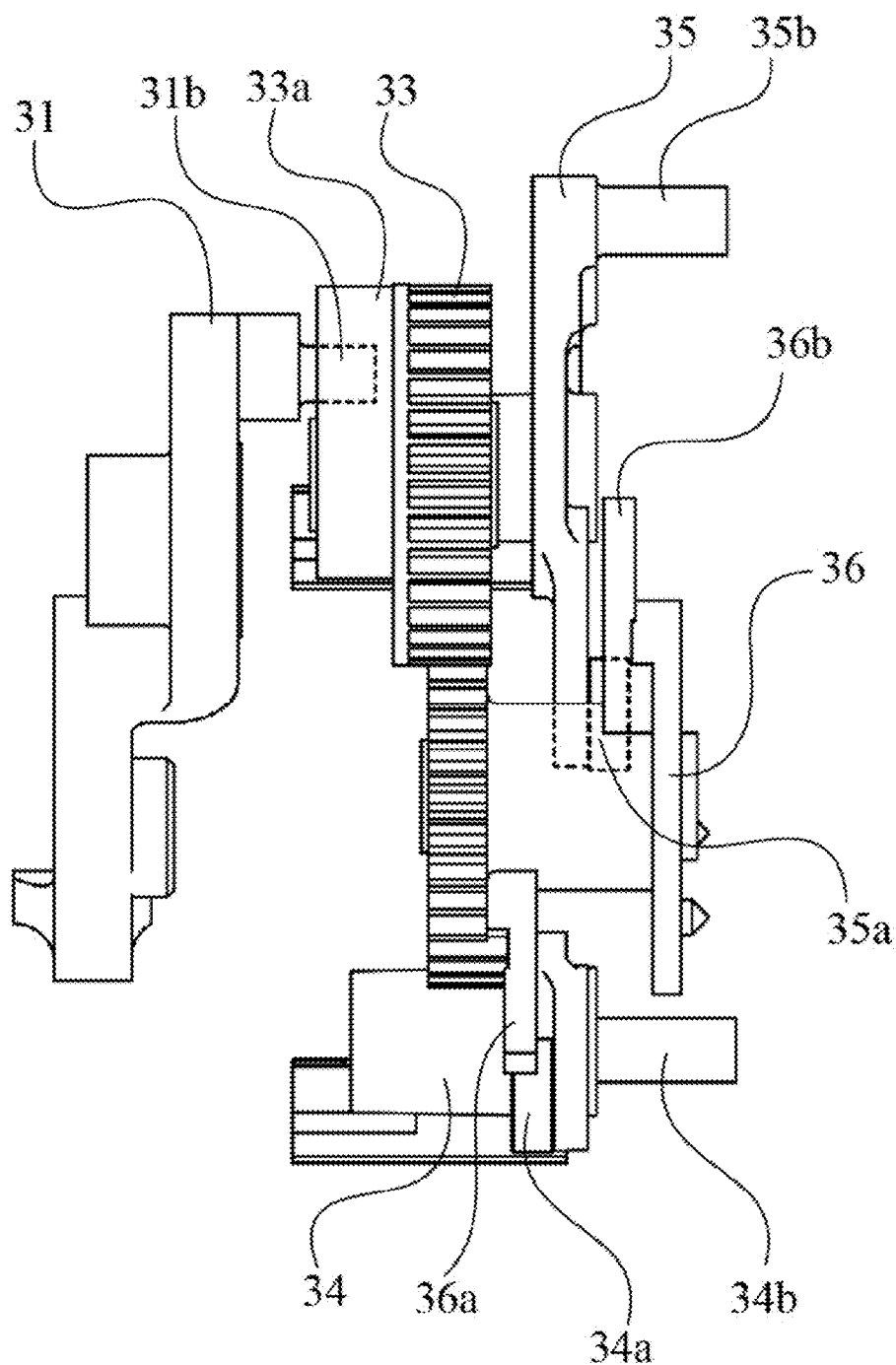
FIG. 6 is a right side view illustrating the charge completed state of the shutter apparatus provided in the image-pickup apparatus of Embodiment 1.

Next, referring to FIGS. 5 to 9, the configuration of the shutter apparatus 4 is described in detail. FIG. 5 and FIGS. 7 to 9 are plan views illustrating only substantially right half seen from the object side of the shutter apparatus 4 that is included in the camera 1. The MG base plate 32 is omitted in these drawings so as to easily see the drawings. Moreover, FIG. 6 is a right side view of the shutter device 4 illustrated in FIG. 5, and omits a part of components.

Figure 7:
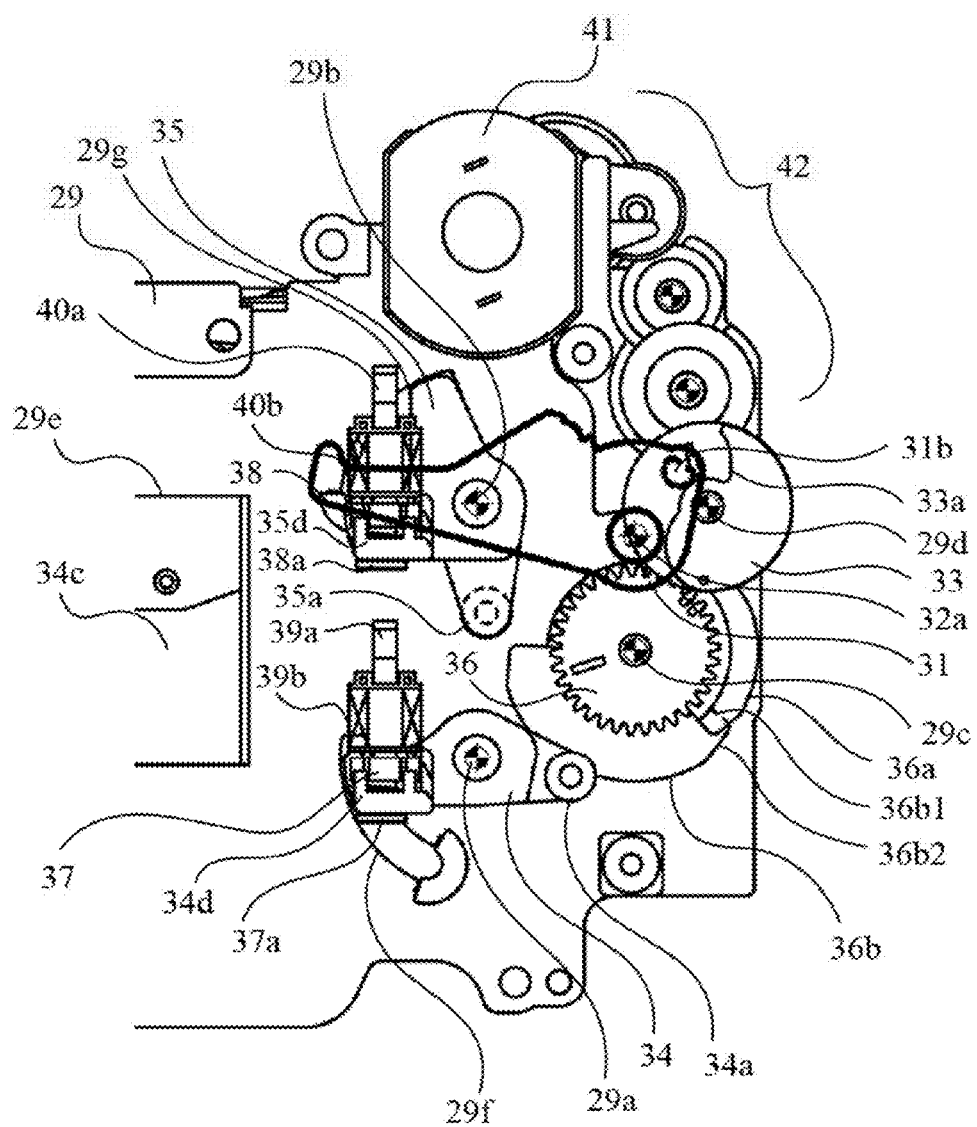
FIG. 7 is a plan view illustrating a standby state before travelling of the shutter apparatus provided in the image-pickup apparatus of Embodiment 1.
Figure 8:
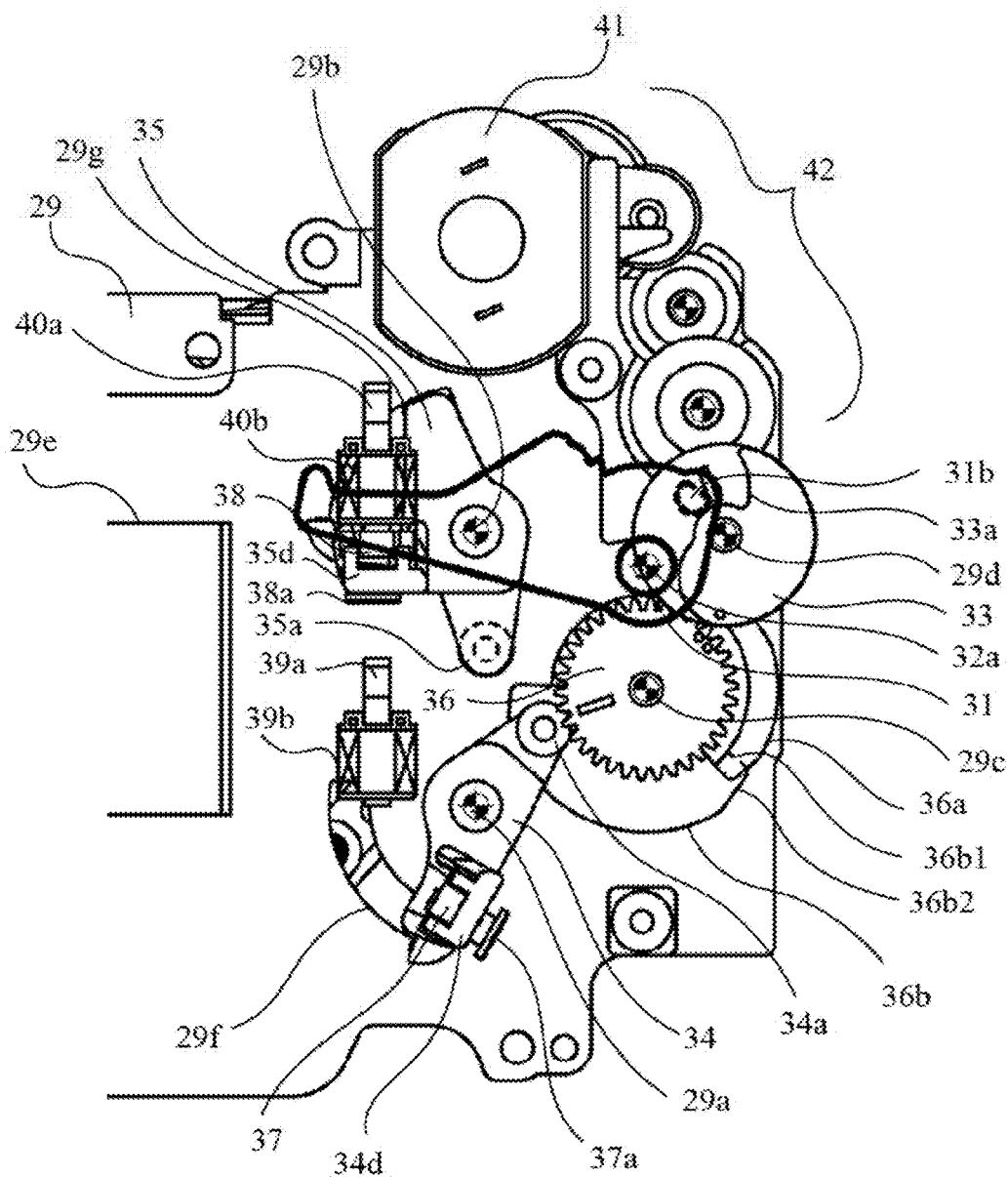
FIG. 8 is a plan view illustrating a leading blade travelling completed state of the shutter apparatus provided in the image-pickup apparatus of Embodiment 1.
Figure 9:
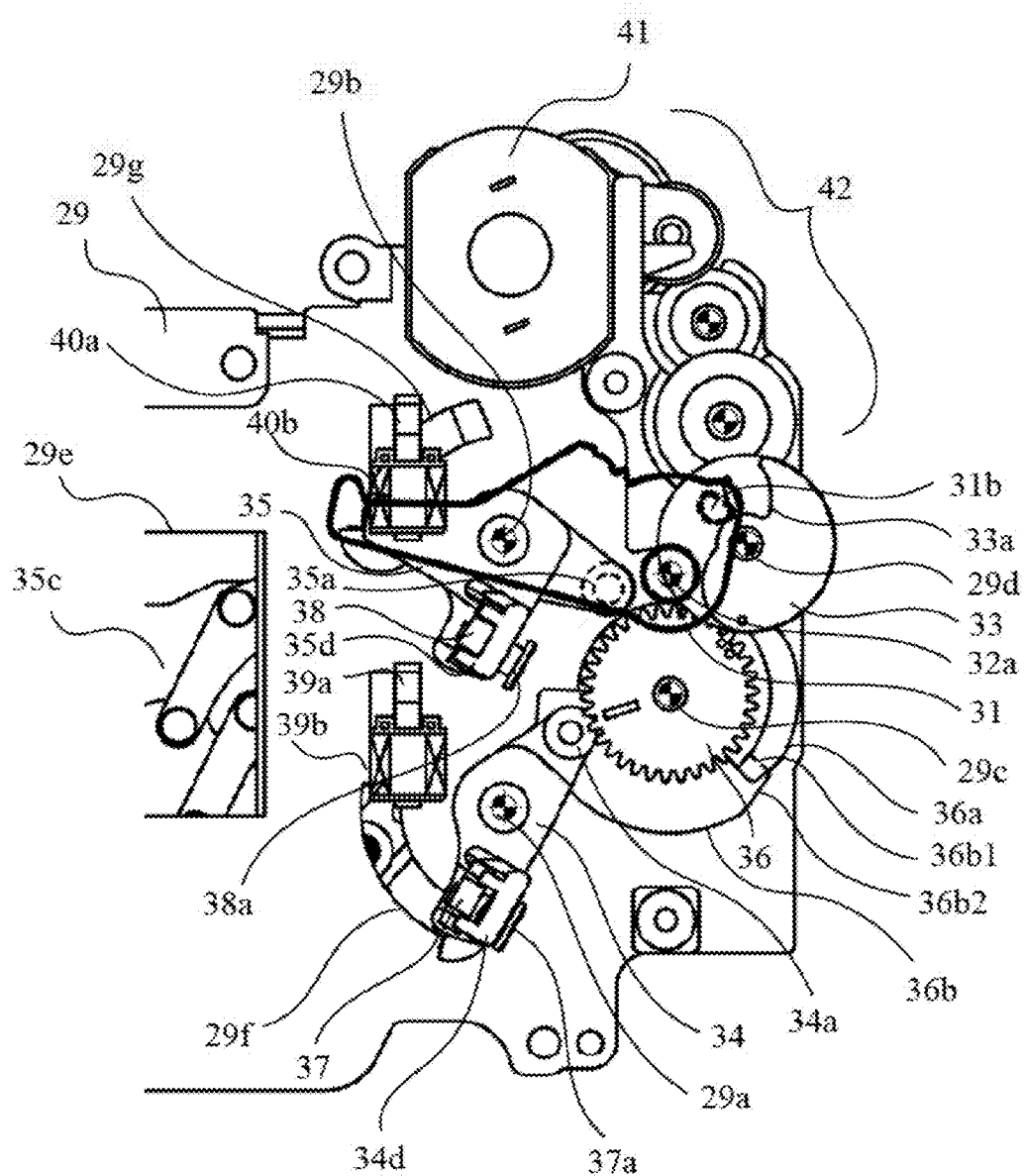
FIG. 9 is a plan view illustrating a trailing blade travelling completed state of the shutter apparatus provided in the image-pickup apparatus of Embodiment 1.

FIG. 5 illustrates an overcharge state where the camera stops. Moreover, FIG. 7 illustrates a standby state before travelling, FIG. 8 illustrates a leading blade travelling completed state, and FIG. 9 illustrates a trailing blade travelling completed state.

A torsion coil spring that is not shown in the drawing is arranged around the axis 29a, and biases the leading blade drive lever 34 in a counterclockwise direction in FIG. 5 (a direction where the leading blade group travels). Reference numeral 29e denotes an aperture formed on the shutter base plate 29, and the light flux of the object passes through the aperture 29e.

A leading blade drive pin 34b formed on a tip of the leading blade drive lever 34 penetrates to a leading blade groove 29f formed on the shutter base plate 29, and engages with a leading blade drive arm that is not shown in drawings. The leading blade drive arm couples with a leading blade group 34c via a link mechanism. The leading blade group 34c includes a plurality of shutter blades.

When the leading blade drive pin 34b moves along to the leading blade groove 29f by rotation of the leading blade drive lever 34, the leading blade group 34c develops and overlaps by rotation of the leading blade drive arm. By the operation of the leading blade group 34c, the aperture 29e can become an open state (a state where the light flux of the object passes) and a closed state (a state where the light flux of the object is approximately blocked). Here, rotation range of the leading blade drive lever 34 is limited by the leading blade groove 29f.

A leading blade amateur supporting part 34d is provided in the leading blade drive lever 34. A through hole that is formed on the leading blade amateur supporting part 34d and is not shown in drawings engages with a leading blade amateur axis 37a that has a flange larger than the inner diameter of the through hole and is integrally provided in the leading blade amateur 37. The leading blade amateur axis 37a extends in a direction substantial perpendicular to an attachment surface of the leading blade amateur 37.

A compression spring that is not shown in drawings is arranged around the leading blade amateur axis 37a between the leading blade amateur 37 and the leading blade amateur supporting part 34d, and biases in a direction where the leading blade amateur 37 and the leading blade amateur supporting part 34d separate each other (vertical direction in FIG. 5).

The leading blade amateur 39 includes a leading blade yoke 39a and a leading blade coil 39b provided around the leading blade yoke 39a. When the leading blade coil 39b is applied to voltage, the leading blade yoke 39a can generate magnetic force, and can attach the leading blade amateur 37 by the magnetic force.

A torsion coil spring that is not shown in drawings is arranged around the trailing blade axis 29b, and biases the trailing blade drive lever 35 in a counterclockwise direction in FIG. 5 (direction where the trailing blade group travels).

A trailing blade drive pin 35b formed on a tip of the trailing blade drive lever 35 penetrates to a trailing blade groove 29g formed on the shutter base blade 29, and engages with a trailing blade drive arm that is not shown in drawings. The trailing blade drive arm couples with a trailing blade group 35c (that is overlapped in FIGS. 5, 7, and 8) via a link mechanism. The trailing blade group 35c includes a plurality of shutter blades.

When the trailing blade drive pin 35b moves along to the trailing blade groove 29g by rotation of the trailing blade drive lever 35, the trailing blade group 35c develops and overlaps by rotation of the trailing blade drive arm. By the operation of the trailing blade group 35c, the aperture 29e can become the open state (a state where the light flux of the object passes) and the closed state (a state where the light flux of the object is approximately blocked). Here, rotation range of the trailing blade drive lever 35 is limited by the trailing blade groove 29g.

A trailing blade amateur supporting part 35d is provided in the trailing blade drive lever 35. A through hole that is formed on the trailing blade amateur supporting part 35d and is not shown in the drawings engages with a trailing blade amateur axis 38a that has a flange larger than the inner diameter of the through hole and is integrally provided in the trailing blade amateur 38. The trailing blade amateur axis 38a extends in a direction substantial perpendicular to an attachment surface of the trailing blade amateur 38.

A compression spring that is not shown in drawings is arranged around the trailing blade amateur axis 38a between the trailing blade amateur 38 and the trailing blade amateur supporting part 35d, and biases in a direction where the trailing blade amateur 38 and the trailing blade amateur supporting part 35d separate each other (vertical direction in FIG. 5).

The trailing blade amateur 40 includes a trailing blade yoke 40a and a trailing blade coil 40b provided around the trailing blade yoke 40a. When the trailing blade coil 40b is applied to voltage, the trailing blade yoke 40a can generate magnetic force, and can attach the trailing blade amateur 38 by the magnetic force.

A leading blade first cam surface 36a1 and a leading blade second cam surface 36a2 are formed on a leading blade cam portion 36a formed on the shutter cam gear 36. The leading blade second cam surface 36a2 is a taper surface that connects the leading blade first cam surface 36a1 with a cam top. Moreover, a cam lift of the leading blade second cam surface 36a2 is smaller than a cam lift of the leading blade first cam surface 36a1. When the shutter cam gear 36 rotates, the leading blade first cam surface 36a1 comes into contact with the leading blade charge roller 34a so as to trace and half of an operation angle of the leading blade drive lever 34 is rapidly charged. Next, when the leading blade second cam surface 36a2 comes into contact with the leading blade charge roller 34a so as to trace, the leading blade drive lever 34 is gently charged. In FIG. 5, the leading blade cam portion 36a charges by rotating the leading blade drive lever 34 that completes the travelling of the leading blade group 34c (the leading blade group 34c overlaps) in a clockwise direction.

A trailing blade first cam surface 36b1 and a trailing blade second cam surface 36b2 are formed on a trailing blade cam portion 36b formed on the shutter cam gear 36. The trailing blade second cam surface 36b2 is a taper surface that connects the trailing blade first cam surface 36b1 with a cam top. Moreover, a cam lift of the trailing blade second cam surface 36b2 is smaller than a cam lift of the trailing blade first cam surface 36b1. When the shutter cam gear 36 rotates, the trailing blade first cam surface 36b1 comes into contact with the trailing blade charge roller 35a so as to trace and half of an operation angle of the trailing blade drive lever 35 is rapidly charged. Next, when the trailing blade second cam surface 36b2 comes into contact with the leading blade charge roller 35a so as to trace, the trailing blade drive lever 35 is gently charged. In FIG. 5, the trailing blade cam portion 36b charges by rotating the trailing blade drive lever 35 that completes the travelling of the trailing blade group 35c (the trailing blade group 35c develops) in a clockwise direction.

The cam surface 33a formed on the mirror cam gear 33 comes into contact with the axis 31b of the mirror drive lever 31 and rotates the mirror drive lever 31 according to rotation of the mirror cam gear 33. In FIG. 5, when the quick return mirror 30 is up state, the cam surface 33a formed on the mirror cam gear 33 charges by rotating the mirror drive lever 31 in a counterclockwise direction.

Next, an operation of the shutter apparatus 4 in actually taking a picture is described.

First, an operation of the shutter apparatus 4 in a mode (normal shooting mode) that takes a picture while observing an object by the optical viewfinder 7 is described with reference to FIGS. 5, and 7 to 9.

In FIG. 5, if the release button 3 is fully pushed, energization of the leading blade coil 39b and the trailing blade coil 40b is started, and the mirror cam gear 33 is rotated in a clockwise direction and the shutter cam gear 36 is rotated in a counterclockwise direction by the rotation of the motor 41. Then, since the axis 31b of the mirror drive lever 31 drops at a cam bottom of the cam surface 33a, the mirror drive lever 31 strikes up the quick return mirror 30. Moreover, the leading blade charge roller 34a and the trailing blade charge roller 35a separate the leading blade cam portion 36a and the trailing blade cam portion 36b of the shutter cam gear 36, respectively, and a state becomes the standby state before travelling that is illustrated in FIG. 7.

In FIG. 7, since the leading blade amateur 37 and the trailing blade amateur 38 are electrically attached to each other, the leading blade drive lever 34 and the trailing blade drive lever 35 do not rotate. After, energizing of the leading blade coil 39b and the trailing blade coil 40b stops by providing an interval time corresponding to a shutter speed by the system controller 14. When energizing of the leading blade coil 39b stops, the leading blade drive lever 34 rotates in a counterclockwise direction and a state becomes the leading blade travelling completed state of FIG. 8. When energizing of the trailing blade coil 40b stops, the trailing blade drive lever 35 rotates in a counterclockwise direction and a state becomes the trailing blade travelling completed state of FIG. 9.

After the completion of an exposure to the image-pickup element 10, the mirror cam gear 33 rotates in a clockwise direction and the shutter cam gear 36 rotates in a counterclockwise direction by the rotation of the motor 41. Then, the cam surface 33a pushes the axis 31b of the mirror drive lever 31, the leading blade cam portion 36a and the trailing blade cam portion 36b push the leading blade charge roller 34a and the trailing blade charge roller 35a, respectively, and thus the state of FIG. 9 returns to the state of FIG. 5.

Figure 10:
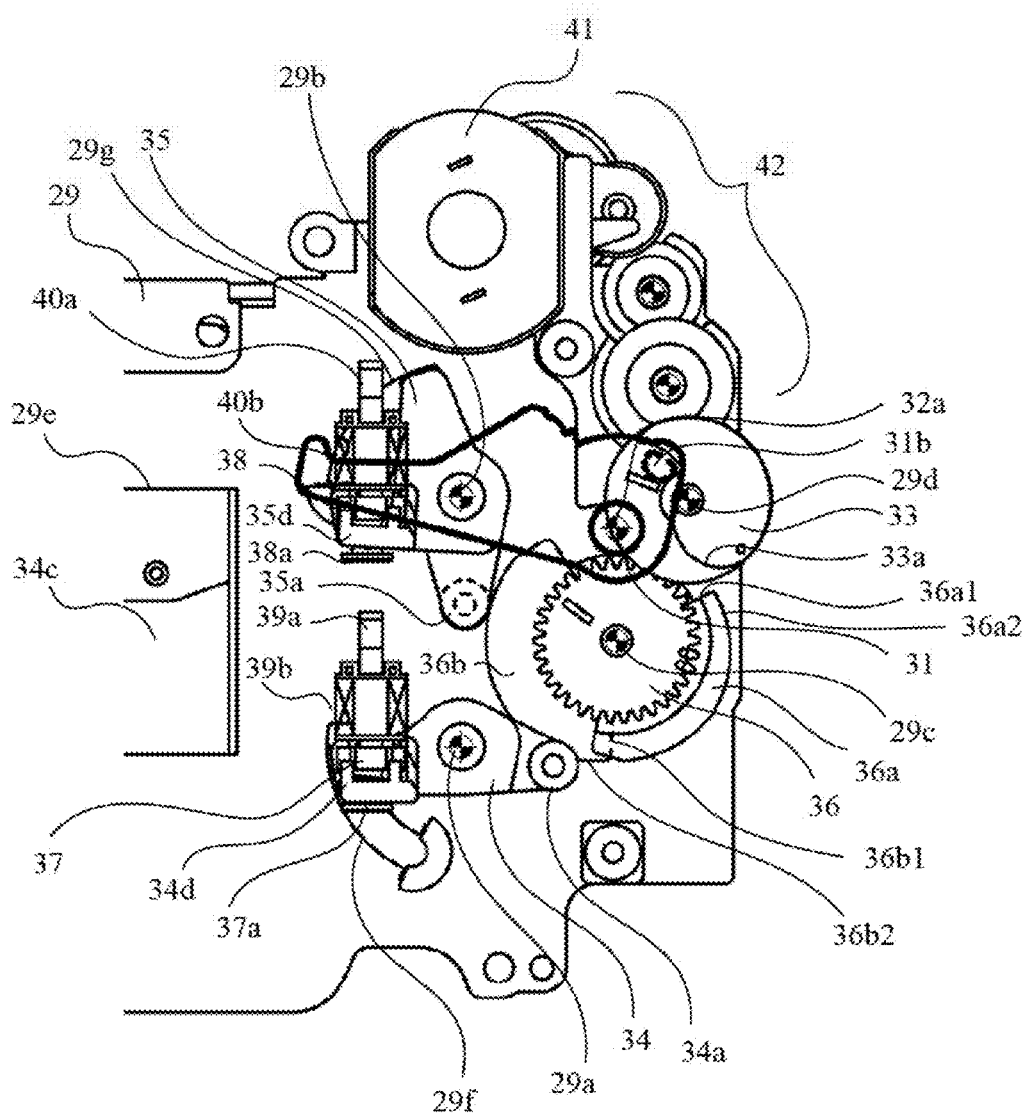
FIG. 10 is a plan view illustrating a standby state before live view of the shutter apparatus provided in the image-pickup apparatus of Embodiment 1.
Figure 11:
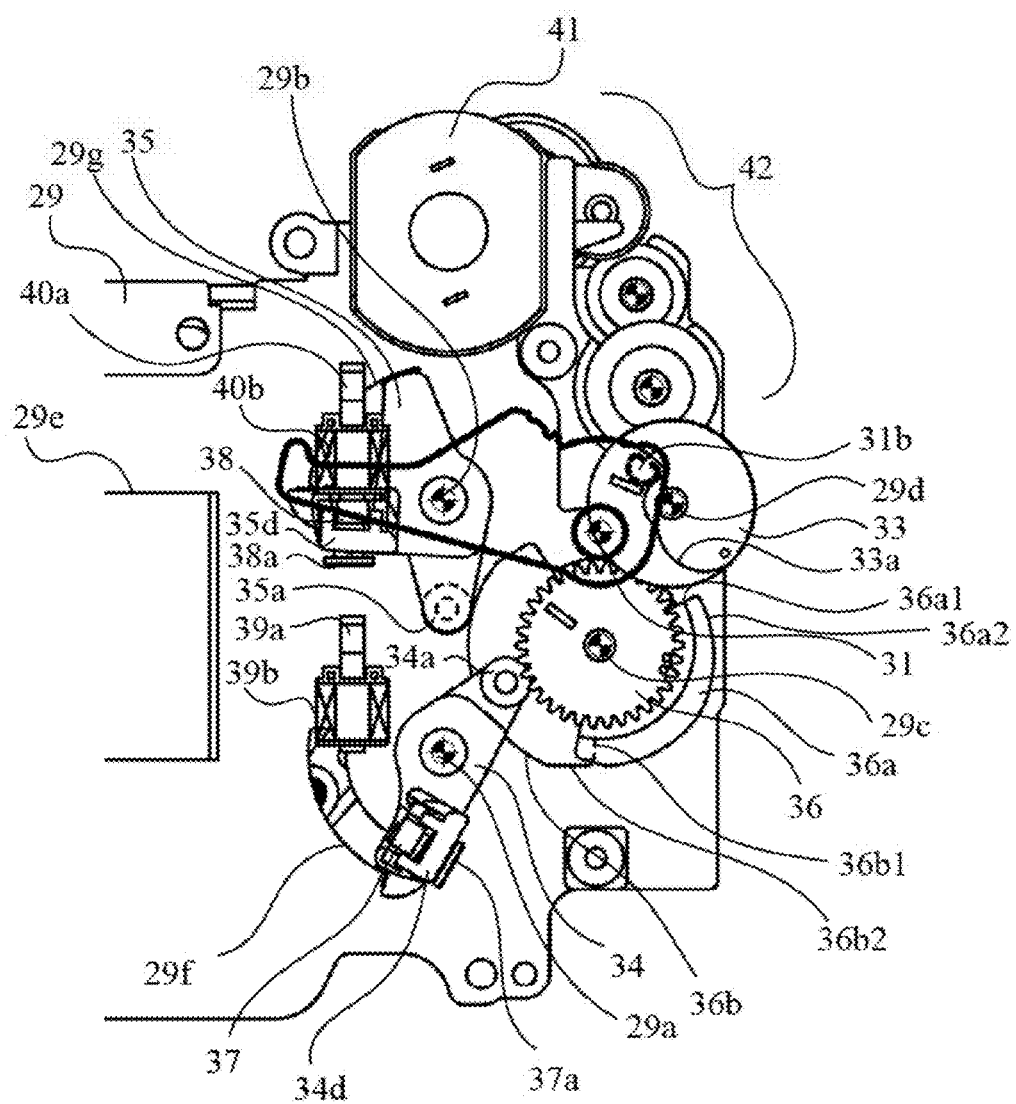
FIG. 11 is a plan view illustrating a live view state of the shutter apparatus provided in the image-pickup apparatus of Embodiment 1.

Next, the operation of the shutter apparatus 4 in shooting by a hybrid shatter in the live view mode is described with reference to FIGS. 5, 8 to 11. FIG. 10 illustrates a standby state before live view and FIG. 11 illustrates a live view state. The object incident to the image-pickup element 10 is displayed in the image display 6 in the live view state.

In FIG. 5, when the live view mode is selected by the mode dial switch 5, energizing to the leading blade coil 39b starts, and the mirror cam gear 33 rotates in a clockwise direction and the shutter cam gear 36 rotates in a counterclockwise direction by the rotation of the motor 41. Then, since the axis 31b of the mirror drive lever 31 drops at the cam bottom of the cam surface 33a as illustrated in FIG. 10, the mirror drive lever 31 strikes up the quick return mirror 30. Moreover, the leading blade cam portion 36a of the shatter cam gear 36 and the leading blade charge roller 34a are separated from each other, however, the trailing blade charge roller 35a comes into contact with the trailing blade cam portion 36b. When energizing to the leading blade coil 39b stops in the state of FIG. 10, the leading blade drive lever 34 travels and a state becomes the state of FIG. 11. In the live view state, since the trailing blade charge roller 35a comes into contact with the trailing blade cam portion 36b, energizing to the trailing blade coil 40b is not needed.

When the release button 3 is fully pushed in the live view state, energizing to the trailing blade coil 40b starts, the mirror cam gear 33 rotates in a clockwise direction and the shutter cam gear 36 rotates in a counterclockwise direction by the rotation of the motor 41, and a state becomes the state of FIG. 8. Then, a state becomes the state of FIG. 9 by providing an interval time corresponding to a shutter speed by the system controller 14, executing a reset scanning of elements of the image-pickup element 10 (hereinafter, referred to as an "electrical leading blade") and off of energizing of the trailing blade coil 40b.

After the exposure to the image-pickup element 10, the charge operation is performed and the state becomes the live view state of FIG. 11 via the states of FIGS. 5 and 10 by the rotation of the motor 41.

Figure 12:
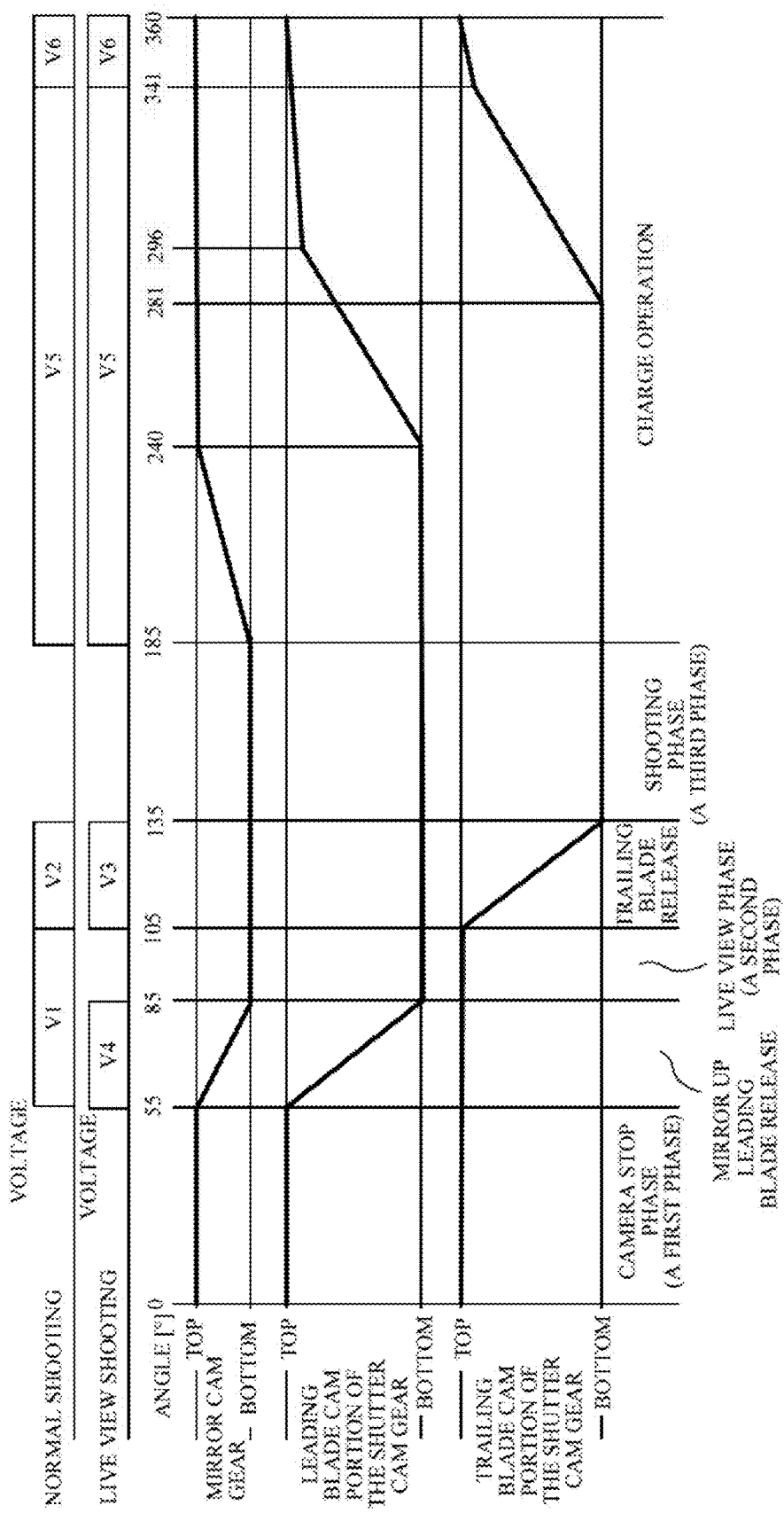
FIG. 12 is a diagram of illustrating a cam diagram and a motor voltage of the shutter apparatus provided in the image-pickup apparatus of Embodiment 1.

FIG. 12 is a cam diagram of the mirror cam gear 33 and the shutter cam gear 36, and is a diagram of illustrating a voltage that is applied to the motor 41 in each interval. FIG. 12 is obtained by phase detection of a phase amateur that is provided at the back side of the mirror cam gear 33 and the shutter cam gear 36, and is not shown in the drawing. The operation of the shutter apparatus 4 is described from the aspect of the cam diagram by using FIG. 12.

A camera stop phase (a first phase) shown in FIG. 5 is a range where the rotational angle of each cam is 0°-55° in the cam diagram, and the cam surface 33a of the mirror cam gear 33, and the leading blade cam portion 36a and the trailing blade cam portion 36b of the shutter cam gear 36 all become cam top state.

When each cam gear rotates toward a range where the rotational angle is 55°-85°, the cam surface 33a of the mirror cam gear 33 evacuates from the rotational trace of the axis 31b of the mirror drive lever 31, and up operation of the quick return mirror 30 is performed. Moreover, the leading blade cam portion 36a of the shutter cam gear 36 evacuates the rotational trace of the leading blade charge roller 34a and the release operation of the leading blade drive lever 34 is performed. As explained above, the camera stop phase changes a live view phase (a second phase) shown between 85°-105°.

When the shutter cam gear 36 rotates toward a range where the rotational angle is 105°-135°, the trailing blade cam portion 36b of the shutter cam gear 36 evacuates from the rational trace of the trailing blade charge roller 35a, and the release operation of the trailing blade drive lever 35 is performed. Thus, the live view phase changes a shooting phase (a third phase) shown between 135°-185°.

Each cam sequentially changes from the bottom to the top, and performs the charge operation between 185°-360°. The cam surface 33a of the mirror cam gear 33 performs the charge operation of the mirror drive lever 31 between 185°-240°. Moreover, the leading blade first cam surface 36a1 performs the charge operation between 240°-296°, and performs the charge operation that corresponds to more than half of the operation angle of the leading blade drive lever 34. The leading blade second cam surface 36a2 performs the charge operation between 296°-360°, and the charge of the leading blade drive lever 34 is completed. The trailing blade first cam surface 36b1 performs the charge operation between 281°-341°, and performs the charge operation that corresponds to more than half of the operation angle of the trailing blade drive lever 35. Additionally, the trailing blade second cam surface 36b2 performs the charge operation between 341°-360°, and the charge operation of the trailing blade drive lever 35 is completed. Thus, the charge operation of the leading blade drive lever 34 and the trailing blade drive lever 35 are completed at 360°.

The leading blade first cam surface 36a1 and the trailing blade first cam surface 36b1 perform the charge operation that corresponds to more than half of the operation angle of the leading blade drive lever 34 and the trailing blade drive lever 35, thus, the leading blade second cam surface 36a2 and the trailing blade second cam surface 36b2 are more gently settable. Therefore, an angular speed in contacting the leading blade amateur 37 with the leading blade electromagnet 39 and an angular speed in contacting the trailing blade amateur 38 with the trailing blade electromagnet 40 can be lower suppressed, and the durability of the shutter apparatus can be more improved.

In order to prevent the exposure during the charge operation, the leading blade drive lever 34 needs to be charged before the trailing blade drive lever 35 is charged. In order to gently charge the leading blade drive lever 34 and improve the durability of the shutter apparatus 4, a charge angle (64°) of the leading blade second cam surface 36a2 is set to be larger than a charge angle (19°) of the trailing blade second cam surface 36b2 so as to complete the charge operations at the same time.

In this embodiment, the leading blade drive lever 34 and the trailing blade drive lever 35 are configured so as to contact the leading blade amateur 37 and the trailing blade amateur 38 with the leading blade electromagnet 39 and the trailing blade electromagnet 40 at the charge angle of 60°, respectively. Since it is preferred that the charge angle of the drive lever by the leading blade first cam surface 36a1 and the trailing blade first cam surface 36b1 be larger than 50°, the leading blade drive lever 34 switches the cam surface at the charge angle of 57° and the trailing blade drive lever 35 switches the cam surface at the charge angle of 57.5°.

In order to increase a continuous shooting speed in the above configuration, a rotational speed of the cam needs to be increased by increasing a torque of the motor 41 or a gear ratio of the reduction gear train 42. Additionally, it is important to become idle running time of the cam as short as possible by setting the camera stop phase and the shooting phase to be as short as possible.

Next, referring to FIG. 12, the voltage that is applied to the motor 41 is described. In FIG. 12, the range where the voltage is not shown become a short brake state that is shorted out between the terminals of the motor 41 and works brake so as to prevent the rotation of the motor 41.

First, the range from the camera stop phase to the shooting phase is considered. The applied voltage to the motor 41 of the case where the camera stop phase directly changes to the shooting phase (normal shooting) and the case where the camera stop phase changes to the live view phase and the live view phase changes to the shooting phase (live view shooting) is described.

The applied voltage (second voltage) V2 to the motor 41 which is applied from the trailing blade release start to the shooting phase)(105°-135°) is smaller than the applied voltage (first voltage) V1 to the motor 41 which is applied from the shooting phase to the trailing blade release start)(55°-105°) relating to the normal shooting. This provides the following two effects.

The first effect is to prevent defective attachment of the trailing blade electromagnet 40. As previously mentioned, the speed at the time of the trailing blade release operation by the shutter cam gear 36 increases if the torque of the motor 41 simply increases so as to shorten the release time lag and increase the continuous shooting speed. Therefore, the speed at the time of contacting the trailing blade drive lever 35 with the trailing blade amateur axis 38a increases. Thus, occurrence of trouble that the trailing blade electromagnet 40 cannot attach and the trailing blade drive lever 35 travels might generate. On the other hand, the leading blade side is released at once when the shutter cam gear 36 starts from the stop state. Therefore, since the leading blade is not released at high rotational speed of the motor 41, the above-mentioned problem is not more remarkable than the trailing blade side. In this embodiment, the speed at the time of contacting the trailing blade drive lever 35 with the trailing blade amateur axis 38a can be decreased at releasing the trailing blade by decreasing the applied voltage to the motor 41 at releasing the trailing blade. Thus, occurrence of trouble that the trailing blade electromagnet 40 cannot attach and the trailing blade drive lever 35 travels can be suppressed since the speed at the time of contacting the trailing blade lever 35 with the trailing blade amateur axis 38a is quick.

The second effect is to become the range of the shooting phase small and increase the shooting speed. Since the applied voltage to the motor 41 is controlled as previously mentioned, overrun of each cam gear at the time of stopping the motor is smaller than overrun when applying the motor 41 to a single voltage. Thus, since the shooting phase can be set small and the idle running time is short at the charge, the shooting speed increases.

Moreover, when the live view phase changes the shooting phase at the live view shooting, the applied voltage (third voltage) V3 to the motor 41 is smaller than the voltage V1 and is higher than the voltage V2. The motor 41 and each cam gear rotate when the motor 41 is driven at the voltage V2 after driving at the voltage V1. On the other hand, the motor 41 and each cam gear stop when the motor 41 is driven at the voltage V3.

The case where the voltage V3 is less than or equal to the voltage V2 is considered. At this time, overrun when changing from the live view phase to the shooting phase (drive at the voltage V3) is smaller than overrun when directly changing from the camera stop phase to the shooting phase (drive at the voltages V1 and V2). Therefore, the width of the shooting phase should be set based on overrun when directly changing from the camera stop phase to the shooting phase. However, the idle running time at the beginning of charge in the live view shooting is long and the continuous shooting speed in the live view shooting slows since overrun when changing from the live view phase to the shooting phase is small.

Then, overrun when directly changing from the camera stop phase to the shooting phase can be reduced as much as possible by controlling the voltage V3 higher than the voltage V2 as previously mentioned. And, it is possible to make overrun when directly changing from the camera stop phase to the shooting phase and overrun when changing from the live view phase to the shooting phase equal. Therefore, the shooting speed increases since the range of the shooting phase is set small and the idle running time at the charge is short at the normal shooting and the live view shooting.

Moreover, the applied voltage (fourth voltage) V4 to the motor 41 is set to be lower than the voltage V1 when changing from the camera stop phase to the live view phase. Therefore, the width of the live view phase can be reduced since overrun at time of stopping the each cam gear in the live view phase is smaller. Therefore, since interval from the camera stop phase to the shooting phase) (55°-135°) is set small compared with time when the applied voltage to the motor 41 is not changed, increase in the release time lag of the normal shooting is suppressed, and the shooting speed can be faster.

Here, the voltages V3 and V4 may be set to be equal to each other. There is an advantage that control becomes simple since the kind of the applied voltage to the motor 41 is decreased.

Next, the range where the charge operation is performed from the shooting phase to the camera stop phase is considered. The same charge operation is performed at the normal shooting and the live view shooting.

When the torque of the motor 41 increases, the angular speed at the time of contacting the leading blade amateur 37 with the leading blade electromagnet 39 and the angular speed at the time of contacting the trailing blade amateur 38 with the trailing blade electromagnet 40 since the acceleration of the motor increases. However, as described above, since the charge angle (64°) of the leading blade second cam surface 36a2 is set larger than the charge angle (19°) of the trailing blade second cam surface 36b2, the influence to the leading blade side is low, and the influence to the trailing blade side is remarkable. Though the charge angle of the trailing blade second cam surface 36b2 may become large so as to solve this problem, there is a limit to the setting since the angle of the cam is 360°.

Then, in this embodiment, the applied voltage V6 to the motor 41 when charging from the trailing blade second cam surface 36b2 to the camera stop phase) (341°-360°) is set to be lower than the applied voltage V5 to the motor 41 when charging from the shooting phase to the trailing blade second cam surface 36b2) (185°-341°). This makes the angular speed at the time of contacting the trailing blade amateur 38 with the trailing blade electromagnet 40 more slowly. Thus, though the shooting speed increases, the difference between the angular speed at the time of contacting the leading blade amateur 37 with the leading blade electromagnet 39 and the angular speed at the time of contacting the trailing blade amateur 38 with the trailing blade electromagnet 40 become small as much as possible. The change of shutter accuracy become small since the difference of the damaged condition of the amateur and the electromagnet of the leading and the trailing blades in durability is small, and time of moving away from the electromagnet of the leading and the trailing blades changes almost at the same time. In addition, since overrun when the charge is completed becomes small, the width of the camera stop phase can be set small. When the width of the camera stop phase is small, the release time lag can be shortened and continuous shooting speed can be increased since the idle running time of the motor 41 when driving from the camera stop phase to the shooting phase is short.

Moreover, since the range driving at the voltage V6 is gently charged by the leading blade second cam surface 36a2 and the trailing blade second cam surface 36b2, a charge load of the range is reduced. Therefore, the voltage V6 can be set to the low voltage to the extent of the range where the motor 41 does not stop by the charge load. In other words, since the range where the charge load is reduced, the voltage V6 can be set to the lower voltage and overrun when the charge is completed can be reduced.

Relating to switching the applied voltage to the motor 41 that has been described, the equivalent voltage may be low by using a well-known PWM control.

[Embodiment 2]

Figure 13:
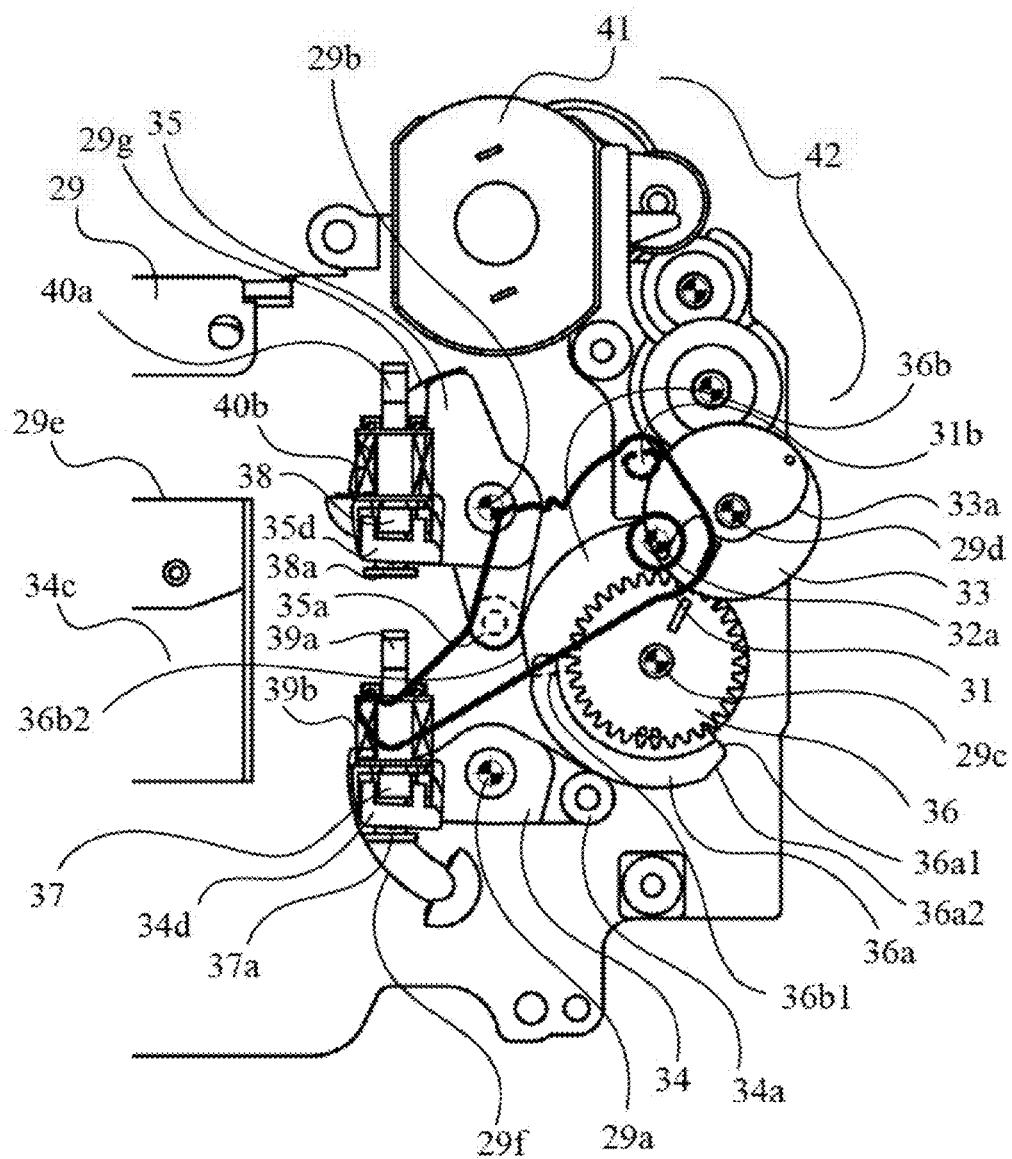
FIG. 13 is a plan view illustrating charge completed state of the shutter apparatus provided in the image-pickup apparatus of Embodiment 2.
Figure 14:
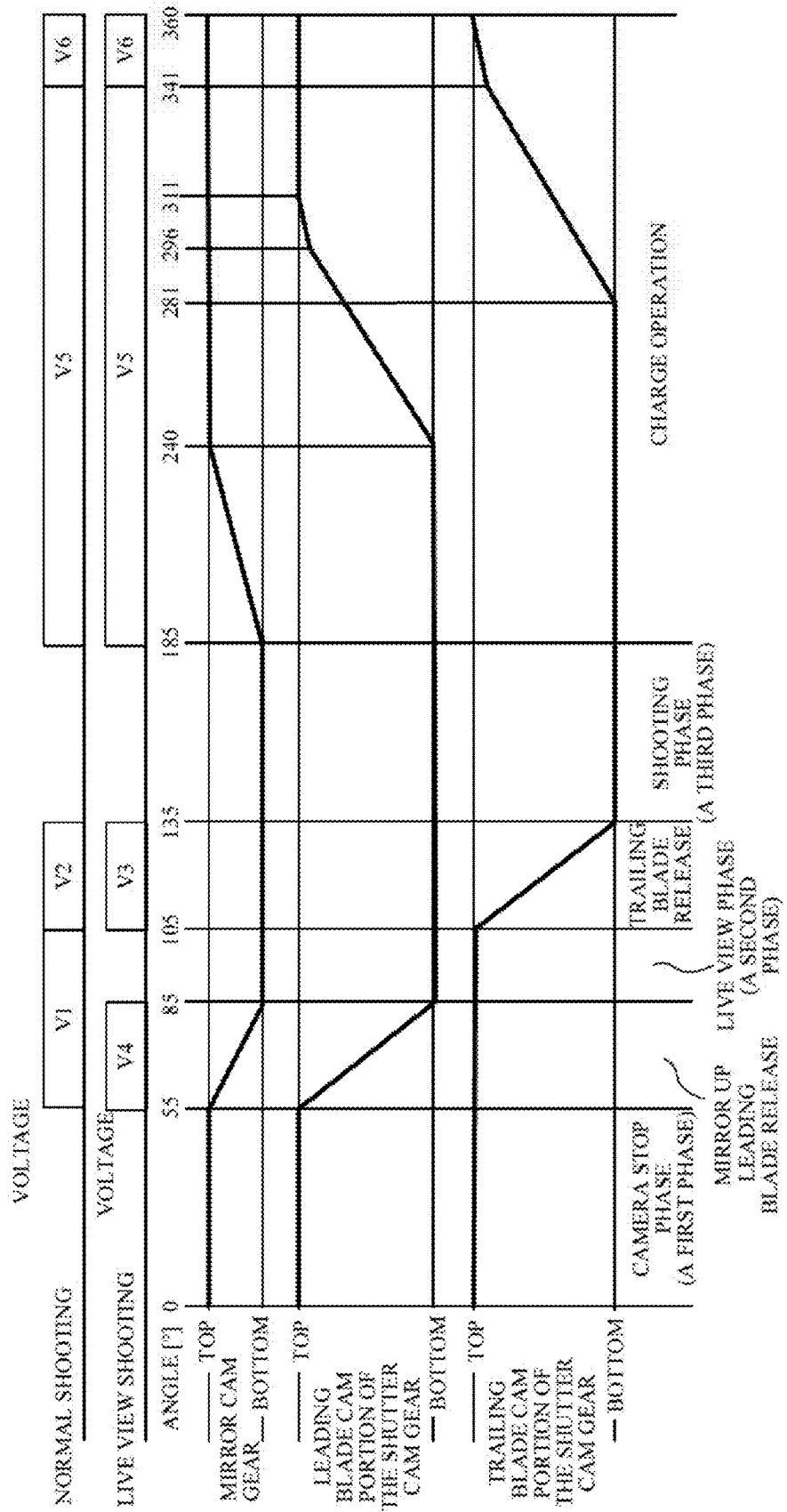
FIG. 14 is a diagram of illustrating a cam diagram and a motor voltage of the shutter apparatus provided in the image-pickup apparatus of Embodiment 2.

Referring to FIGS. 13 and 14, an image-pickup apparatus that is the second embodiment of the present invention is described.

FIG. 13 is a plan view illustrating the charge operation completed state of the shutter apparatus provided in the image-pickup apparatus of the second embodiment is shown, and FIG. 14 is a cam diagram and a diagram of illustrating a motor voltage of the shutter apparatus provided in the image-pickup apparatus of the second embodiment.

The difference from the first embodiment is a shape of the leading blade second cam surface 36a2. The leading blade second cam surface 36a2 is within 296°-360° in the first embodiment, however, the leading blade second cam surface 36a2 is within 296°-311° in the second embodiment. Further, from FIG. 14, the charge operation on the leading blade second cam surface 36a2 ends before the beginning of the charge operation by the trailing blade second cam surface 36b2. The charge operation of the leading blade drive lever 34 ends before the drive at the voltage V6. Therefore, the voltage V6 can be set lower since the load of the charge operates is reduced. By being the voltage V6 low, overrun of the shutter cam gear 36 at the time of completing the charge operation is reduced and the width of the camera stop phase can be set smaller. Thus, since the idle running time of the shutter cam gear 36 becomes small, the continuous shooting speed can be fast.

On the other hand, since the charge operation area of the leading blade second cam surface 36a2 is smaller than that in the first embodiment, the first embodiment is more advantageous for the durability of the shutter.

The detailed descriptions on other parts are omitted since they are the same as those of the first embodiment.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application Nos. 2012-065171, filed on Mar. 22, 2012, and 2012-065236, filed on Mar. 22, 2012, which are hereby incorporated by reference herein in their entirety.

What is claimed is:

1. An image-pickup apparatus comprising:
a driving member for leading blades configured to drive a leading blade group;
a driving member for trailing blades configured to drive a trailing blade group;
a cam member configured to rotate the driving member for leading blades and the driving member for trailing blades;
a motor configured to drive the cam member; and
a controller configured to control the motor,
wherein the controller applies
a second voltage that is lower than a first voltage applied in releasing the driving member for leading blades to the motor when the driving member for trailing blades is released at normal shooting, and
a third voltage that is lower than the first voltage and that is higher than the second voltage to the motor when the driving member for trailing blades is released at live view shooting.

2. The image-pickup apparatus according to claim 1, wherein the controller applies a fourth voltage that is lower than the first voltage to the motor when the driving member for leading blades is released at the live view shooting.

3. The image-pickup apparatus according to claim 1, wherein the third voltage is equal to the fourth voltage.

4. The image-pickup apparatus according to claim 1, wherein a leading blade first cam surface where the driving member for leading blades traces, a leading blade second cam surface having a cam lift smaller than a cam lift of the leading blade first cam surface, a trailing blade first cam surface where the driving member for trailing blades traces, and a trailing blade second cam surface having a cam lift smaller than a cam lift of the trailing blade first cam surface are formed on the cam member, and
wherein the controller controls an applied voltage to the motor in performing charge operation on the trailing blade second cam surface by the cam member so as to be lower than an applied voltage to the motor in performing charge operation on the trailing blade first cam surface by the cam member.

5. The image-pickup apparatus according to claim 4, wherein a rotation angle of the cam member in performing the charge operation on the leading blade second cam surface is larger than a rotation angle of the cam member in performing the charge operation on the trailing blade second cam surface.

6. The image-pickup apparatus according to claim 5, wherein both the charge operations of the driving member for leading blades and the driving member for trailing blades are completed at the same time.

7. The image-pickup apparatus according to claim 4, wherein the charge operation on the leading blade second cam surface ends before the beginning of the charge operation on the trailing blade second cam surface.

8. An image-pickup apparatus comprising:
a driving member for leading blades configured to drive a leading blade group;
a driving member for trailing blades configured to drive a trailing blade group;
a cam member configured to rotate the driving member for leading blades and the driving member for trailing blades;
a motor configured to drive the cam member; and
a controller configured to control the motor,
wherein a leading blade first cam surface where the driving member for leading blades traces, a leading blade second cam surface having a cam lift smaller than a cam lift of the leading blade first cam surface, a trailing blade first cam surface where the driving member for trailing blades traces, and a trailing blade second cam surface having a cam lift smaller than a cam lift of the trailing blade first cam surface are formed on the cam member, and
wherein the controller controls an applied voltage to the motor in performing charge operation on the trailing blade second cam surface by the cam member so as to be lower than an applied voltage to the motor in performing charge operation on the trailing blade first cam surface by the cam member.

9. The image-pickup apparatus according to claim 8, wherein a rotation angle of the cam member in performing charge operation on the leading blade second cam surface is larger than a rotation angle of the cam member in performing charge operation on the trailing blade second cam surface.

10. The image-pickup apparatus according to claim 9, wherein both the charge operations of the driving member for leading blades and the driving member for trailing blades are completed at the same time.

11. The image-pickup apparatus according to claim 8, wherein the charge operation on the leading blade second cam surface ends before the beginning of the charge operation on the trailing blade second cam surface.

* * * * *